M. KELLY.

BARBED FENCE-WIRE.

Reissued April 4, 1876.

No. 7,035.

○ a. ⊗ a

William T. Calkins, Assignee of Michael Kelly,

Inventor.

Witnesses:
Heinrich L. Bruns.
L. M. Harris.

By Coburn & Flagler
Attys.

N. PETERS, Photo-Lithographer, Washington, D. C.

UNITED STATES PATENT OFFICE.

MICHAEL KELLY, OF NEW YORK, N. Y., ASSIGNOR, BY MESNE ASSIGNMENTS, TO WILLIAM T. CALKINS, OF CHICAGO, ILLINOIS.

IMPROVEMENT IN BARBED FENCE-WIRES.

Specification forming part of Letters Patent No. 84,062, dated November 17, 1868; reissue No 7,035, dated April 4, 1876; application filed February 9, 1876.

DIVISION A.

*To all whom it may concern:*

Be it known MICHAEL KELLY, of the city and county of New York, and State of New York, did invent a new and useful Improvement in Metallic Fences, which is fully set forth in the following specification, reference being had to the accompanying drawings, in which—

Figure 1:
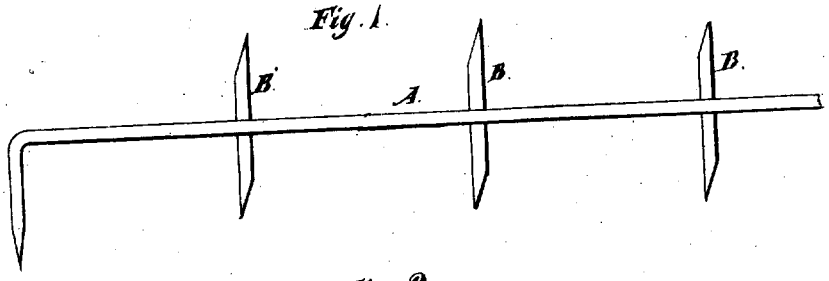
Figure 2:
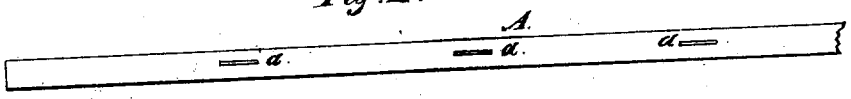
Figure 3:
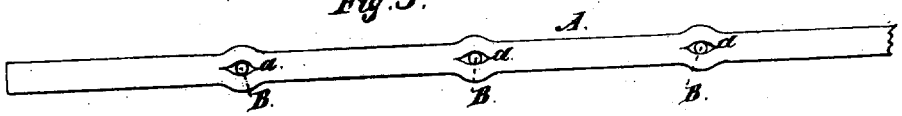
Figure 4:
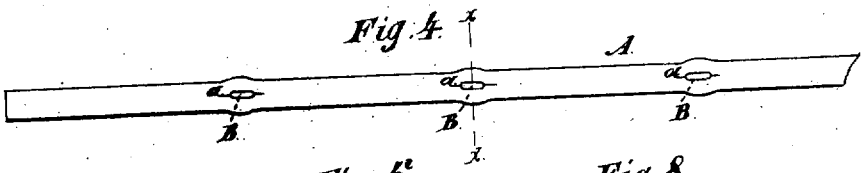
Figure 6:
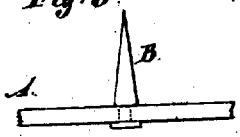
Figure 5:
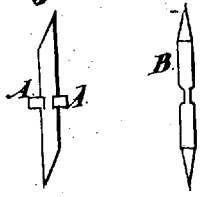
Figure 8:
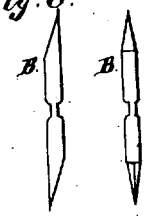
Figure 7:
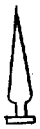

Figure 1 is a plan view of a portion of the wire with the thorns in place, the wire being a flat strip and presented edge upward. Fig. 2 is a side view of the same, representing the wire after the holes have been marked, or slightly cut through by a sharp instrument before they have been spread open. Fig. 3 represents the wire after the holes have been spread open by the introduction of a pointed punch, or other light instrument, and the thorns have been inserted, but not secured. Fig. 4 represents the same after the thorns have been firmly secured by compressing the wire and the thorn forcibly together. Fig. 5 represents a cross-section taken on the line *x*, *x*, Fig. 4. Fig. 6 is a plan view of a modification, in which the thorn is made in the form of a common tack. Fig. 7 represents the tack separately before its connection with the wire, and Fig. 8 represents a thorn prepared from common round wire, cut obliquely.

The object of this invention is to improve the construction of fence-wires carrying thorns, or pointed pieces of metal.

The invention consists in the use of a flat wire through which holes are made, in which thorns are inserted and secured.

In the drawings, A is a flat wire, rolled, or otherwise prepared in lengths of any desired extent. Through this wire holes *a* are produced by punching or otherwise, by hand, or by machinery.

The thorns B are made from common round wire, by cutting it off obliquely, as clearly shown in Fig. 8. They may be cut by hand or by machinery, and by cutting them obliquely, a sharp point is secured at each end without loss of material, and with very little labor.

The thorns B are thrust into the holes *a* in the wire, and are there retained by compressing the wire upon the throns by a blow with a hammer, or in any other suitable manner. As an additional means of security the thorns may be griped in suitable machinery before inserting them in the wire, so as to compress them near the middle and thus adapt them to be more readily locked. After such compression the thorns will present the appearance shown in Fig. 8 of the drawing.

The thorns may be set in the wire after the fence is erected, if necessary in any case, but it is preferable to set the thorns by hand or by machinery before the wire has left the manufactory. It is also preferable to form the thorns of metal which is a little softer than the wire, so that in the act of compression the thorns will yield and be firmly locked without much drawing or diminishing the thickness of the main wire at that point.

The material for this thorny fence-wire may be iron, tinned, or otherwise protected from the weather, and it can be made in any length desired, the thorns being fixed in the wire at such distances apart as may be desired.

The wires A are represented in the drawings as pointed at the ends and bent at right angles, as indicated at A′. The lengths of thorny wire may be attached to posts set at suitable distances apart, by driving the bent end therein, or they may be attached in any other suitable manner, as the method of their attachment forms no part of the present invention.

Having thus described the invention, what is claimed as new, and desired to be secured by Letters Patent, is—

1. A thorny fence-wire, consisting of a flat wire, A, and barbs B, inserted and held in holes in the wire, substantially as described.

2. The method herein described of attaching thorns or barbs to a fence-wire, by inserting the barbs in holes in the wire and compressing the wire and the barbs forcibly together, substantially as described.

WILLIAM T. CALKINS.

Witnesses:
L. A. BUNTING,
HENRY F. BRUNS.